US008120607B1

(12) United States Patent
Legakis et al.

(10) Patent No.: US 8,120,607 B1
(45) Date of Patent: Feb. 21, 2012

(54) BOUNDARY TRANSITION REGION STITCHING FOR TESSELLATION

(75) Inventors: Justin S. Legakis, Sunnyvale, CA (US); Henry Packard Moreton, Woodside, CA (US)

(73) Assignee: NVIDIA Corporation, Santa Clara, CA (US)

(*) Notice: Subject to any disclaimer, the term of this patent is extended or adjusted under 35 U.S.C. 154(b) by 867 days.

(21) Appl. No.: 12/130,684

(22) Filed: May 30, 2008

(51) Int. Cl.
*G06T 17/20* (2006.01)
*G06T 17/00* (2006.01)

(52) U.S. Cl. ........................................ 345/423; 345/428
(58) Field of Classification Search .................. 345/423, 345/428
See application file for complete search history.

(56) References Cited

U.S. PATENT DOCUMENTS

| | | | | |
|---|---|---|---|---|
| 5,377,320 | A * | 12/1994 | Abi-Ezzi et al. | 345/502 |
| 6,016,153 | A * | 1/2000 | Gueziec et al. | 345/441 |
| 6,184,897 | B1 * | 2/2001 | Gueziec et al. | 345/440 |
| 6,184,908 | B1 * | 2/2001 | Chan et al. | 345/522 |
| 6,504,537 | B1 * | 1/2003 | Moreton et al. | 345/423 |
| 6,515,660 | B1 * | 2/2003 | Marshall et al. | 345/420 |
| 6,597,356 | B1 * | 7/2003 | Moreton et al. | 345/423 |
| 6,600,488 | B1 * | 7/2003 | Moreton et al. | 345/423 |
| 6,624,811 | B1 * | 9/2003 | Moreton et al. | 345/423 |
| 6,707,452 | B1 * | 3/2004 | Veach | 345/423 |
| 6,879,324 | B1 * | 4/2005 | Hoppe | 345/423 |
| 6,906,716 | B2 * | 6/2005 | Moreton et al. | 345/423 |
| 2002/0018066 | A1 * | 2/2002 | Vizer | 345/428 |
| 2003/0076319 | A1 * | 4/2003 | Hiraga | 345/420 |
| 2003/0142100 | A1 * | 7/2003 | Lavelle et al. | 345/537 |
| 2004/0104915 | A1 * | 6/2004 | Mori et al. | 345/561 |
| 2005/0195188 | A1 * | 9/2005 | Goel et al. | 345/423 |
| 2006/0132488 | A1 * | 6/2006 | Lim et al. | 345/428 |
| 2007/0002049 | A1 * | 1/2007 | Cerny | 345/428 |

OTHER PUBLICATIONS

Lord et al., Dec. 2005, "Using genetic algorithms to optimise triangle strips", Proceedings of the 3rd international conference on Computer graphics and interactive techniques in Australasia and South East Asia, (Graphite '05), ACM, New York, NY, USA, pp. 169-176.*

Henry Moreton, Aug. 2001, "Watertight tessellation using forward differencing", Proceedings of the ACM SIGGRAPH/EUROGRAPHICS workshop on Graphics hardware (HWWS '01), ACM, New York, NY, USA, pp. 25-32.*

Agrawal, A.; Radhakrishna, M.; Joshi, R.C.; , "An approach to improve rendering performance of large multiresolution phototextured terrain models using efficient triangle strip generation," Geoscience and Remote Sensing Symposium, 2005. IGARSS '05. Proceedings. 2005 IEEE International , vol. 7, no., pp. 4984-4987, Jul. 25-29, 2005.*

(Continued)

*Primary Examiner* — Daniel Hajnik
*Assistant Examiner* — Robert D Prendergast
(74) *Attorney, Agent, or Firm* — Patterson & Sheridan, LLP

(57) ABSTRACT

A system and method for stitching a boundary transition region of a patch produces a graphics primitive topology for the boundary transition region of the patch. A first number of vertices is computed for an inside edge of the boundary transition region using a first tessellation level of detail (LOD) of the inside edge. A second number of vertices is computed for an outside edge of the boundary transition region using a second tessellation LOD of the outside edge. A portion of the first number of vertices and the second number of vertices are merged based on a stitching pattern to produce a set of vertices for the boundary transition region. The set of vertices is stitched to produce an ordered list representing the graphics primitive topology.

18 Claims, 9 Drawing Sheets

OTHER PUBLICATIONS

Loop, Charles and Shaefer, Scott, "Approximating Catmull-Clark Subdivision Surfaces with Bicubic Patches", Microsoft Technical Report MSR-TR-2007-44, Apr. 24, 2007, 18 pages, retrieved from: http://research.microsoft.com/en-us/um/people/cloop/accTOG.pdf.*

Loop, Charles and Shaefer, Scott, "Managing Adjacency in Triangular Meshes", Microsoft Technical Report MSR-TR-2000-24, Jan. 12, 2000, 23 pages, retrieved from: http://research.microsoft.com/en-us/um/people/cloop/msrtr-2000-24.pdf.*

Renato Pajarola and Enrico Gobbetti, "Survey of semi-regular multiresolution models for interactive terrain rendering", The Visual Computer, vol. 23, Issue 8, Jul. 2007, pp. 583-605.*

El-Sana, et al., Copyright © 1999, "Skip Strips: Maintaining Triangle Strips for View-dependent Rendering", Proceedings of the 10th IEEE Visualization 1999 Conference (VIS '99), (Visualization '99), IEEE Computer Society, Washington, DC, pp. 131-140.*

El-Sana, J., Evans, F., Kalaiah, A., Varshney, A., Skiena, S., and Azanli, E., "Efficiently computing and updating triangle strips for real-time rendering", Computer-Aided Design vol. 32, 13 (Oct. 2000), 753-772.*

Gabriel Taubin and Jarek Rossignac, "Geometric compression through topological surgery", ACM Transactions on Graphics, vol. 17, Issue 2, Apr. 1998, pp. 84-115.*

Birkholz, Hermann, "Patch-Trees for Fast Level-of-Detail Synthesis", Proceedings of the 15th International Conference in Central Europe on Computer Graphics, Visualization and Computer Vision (WSCG 2007), University of West Bohemia, Plzen, Campus Bory, Jan. 30, 2007, 5 pages.*

* cited by examiner

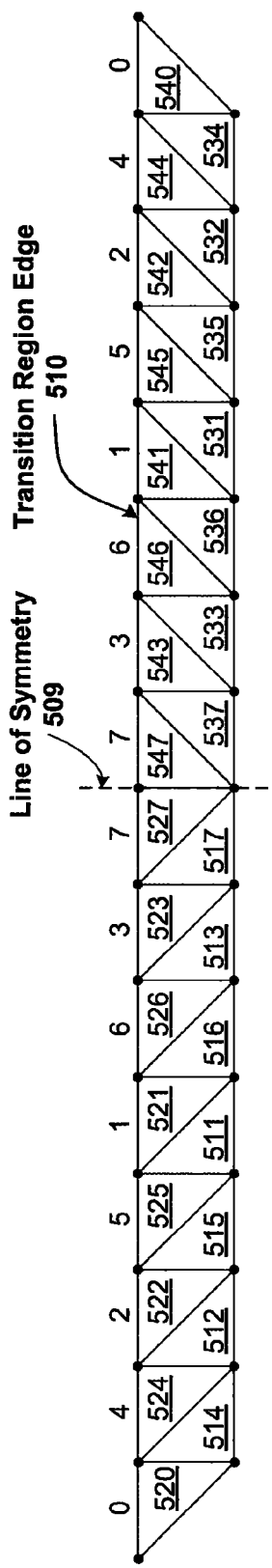
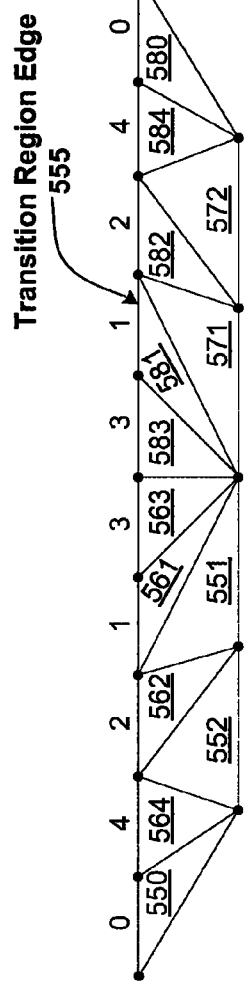
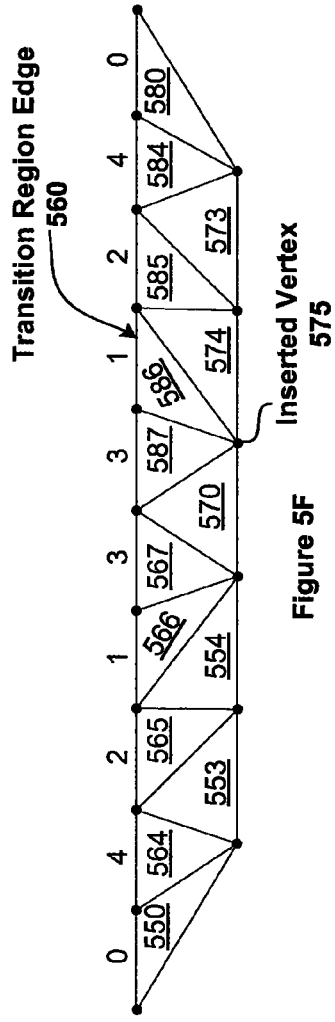

BOUNDARY TRANSITION REGION STITCHING FOR TESSELLATION

BACKGROUND OF THE INVENTION

1. Field of the Invention

The present invention generally relates to tessellation of patches in three-dimensional space to produce graphics primitives and more specifically to a system and method for stitching a boundary transition region on the edges of a patch.

2. Description of the Related Art

Surfaces in three-dimensional space are typically subdivided into patches for processing in order to produce an image. Conventional techniques define boundary transition regions between patches where the level of tessellation may vary. Current mechanisms for stitching vertices within boundary transition regions do not necessarily produce graphics primitives that are similar in size, particularly when tessellation levels of detail on either size of the transition region differ greatly. Similarly sized graphics primitives produce better quality images when the graphics primitives are rendered. Additionally, similarly sized graphics primitives produce a smoothly-varying triangle mesh for various combinations of tessellation levels of detail as the tessellation levels of detail change over time and across adjacent boundary transition regions. In some cases the graphics primitives in a boundary transition region are very long and narrow which may produce a triangle mesh that is not smoothly-varying.

Accordingly, what is needed in the art is an improved stitching for boundary transition regions.

SUMMARY OF THE INVENTION

A system and method for tessellating a patch in three-dimensional space and stitching graphics primitives to define a topology of a boundary transition region of the patch. The topology includes high quality graphics primitives that form a smoothly-varying triangle mesh for various combinations of tessellation levels of detail. The triangle mesh topology varies smoothly as the tessellation levels of detail change continuously over time and across adjacent boundary transition regions. The stitching algorithm produces high quality graphics primitives that have similar aspect ratios, so that triangles are more equilateral rather than long and narrow. Additionally, the high quality graphics primitives are stitched so that the number of triangles that meet or share a vertex is consistent, so that the triangles produced by the stitching algorithm are distributed evenly between the vertices.

Various embodiments of a method of the invention for stitching a boundary transition region of a patch include computing a first number of vertices for an inside edge of the boundary transition region using a first level of detail (LOD) of the inside edge and computing a second number of vertices for an outside edge of the boundary transition region using a second LOD of the outside edge. A portion of the first number of vertices and the second number of vertices are merged based on a stitching pattern to produce a set of vertices for the boundary transition region. The set of vertices is stitched to produce an ordered list representing the graphics primitive topology for the boundary transition region of the patch.

Various embodiments of the invention include a system for stitching a boundary transition region of a patch. The system includes a boundary transition region stitching unit that is configured to compute a first number of vertices for an inside edge of the boundary transition region using a first tessellation level of detail (LOD) of the inside edge, compute a second number of vertices for an outside edge of the boundary transition region using a second tessellation LOD of the outside edge. Merge a portion of the first number of vertices and the second number of vertices based on a stitching pattern to produce a set of vertices for the boundary transition region, and stitch the set of vertices to produce an ordered list representing a graphics primitive topology for the boundary transition region of the patch.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5D illustrates a transition region edge with a graphics primitive stitching pattern in accordance with one or more aspects of the present invention;

FIG. 5E illustrates a transition region edge with levels of detail of ten and six in accordance with one or more aspects of the present invention;

FIG. 5F illustrates a transition region edge with levels of detail of ten and seven in accordance with one or more aspects of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
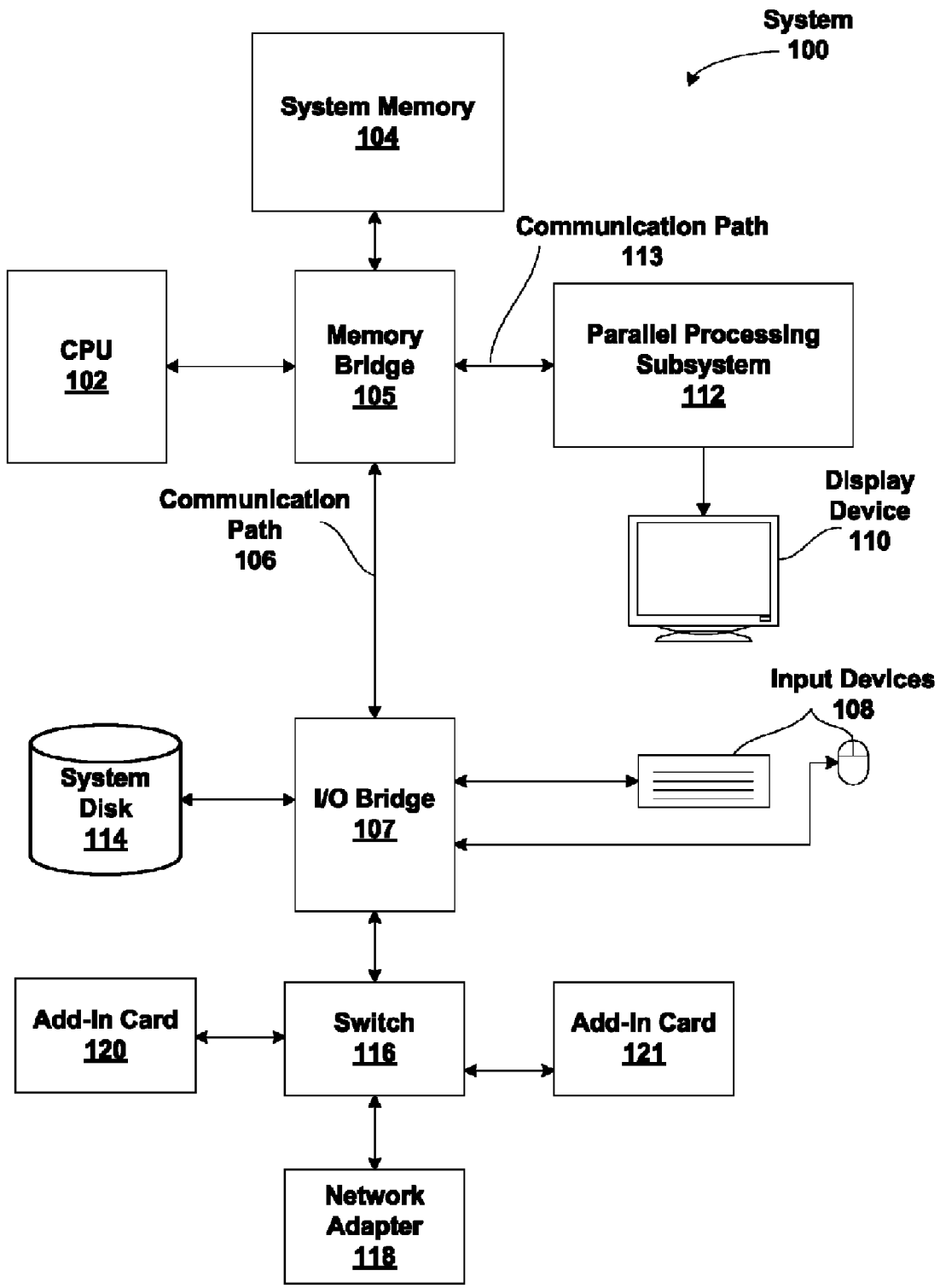
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
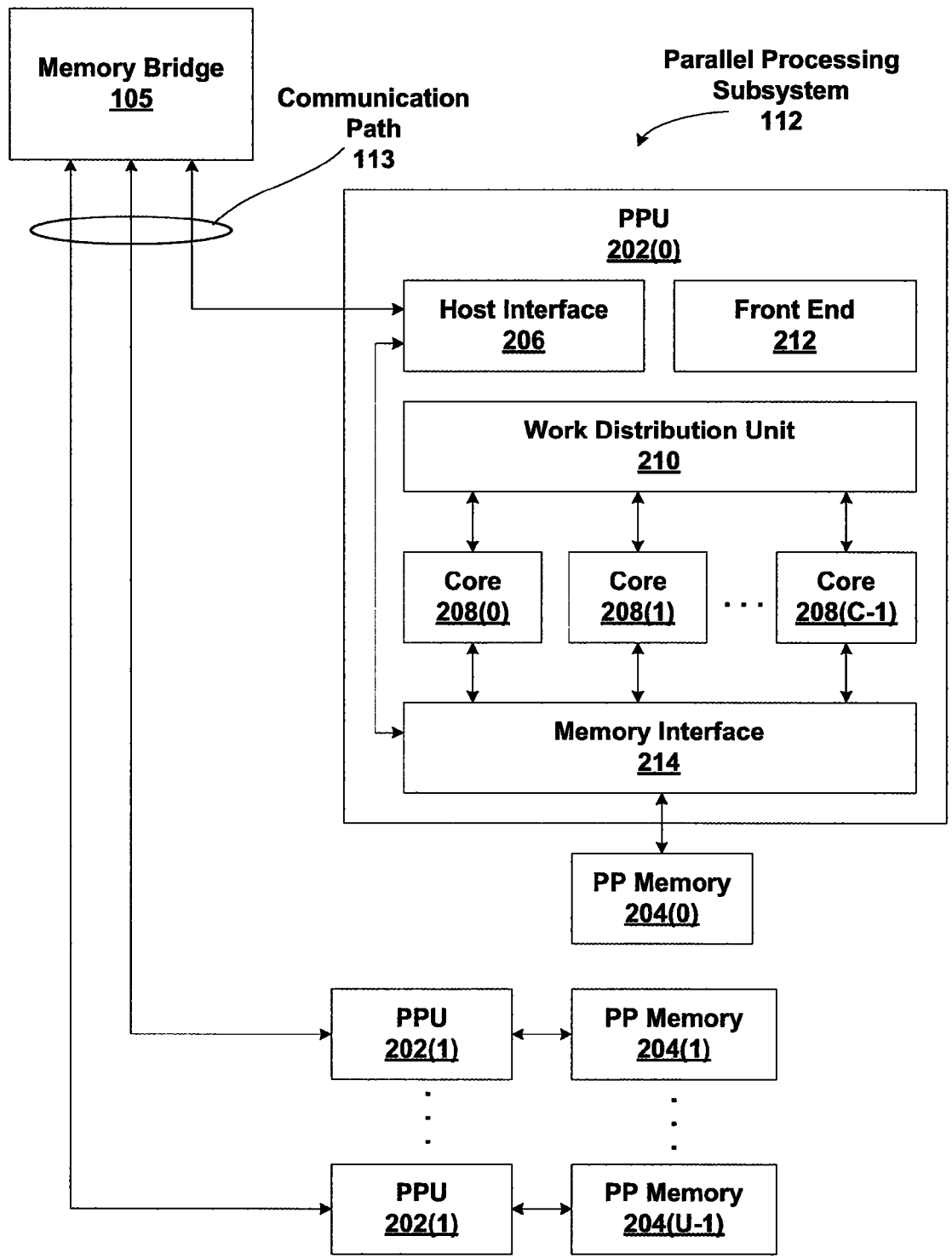
FIG. 2 is a block diagram of a parallel processing subsystem for the computer system of FIG. 1 in accordance with one or more aspects of the present invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 may be allocated for processing different types of programs or processing. For example, a first set of cores 208 may be allocated to perform tessellation operations, including vertex stitching to define primitive topologies. A second set of cores 208 may be allocated to perform tessellation shading to evaluate patch parameters for the primitive topology and determine vertex positions and other per-vertex attributes. The allocation of cores 208 may vary dependent on the workload for each type of program or processing.

Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
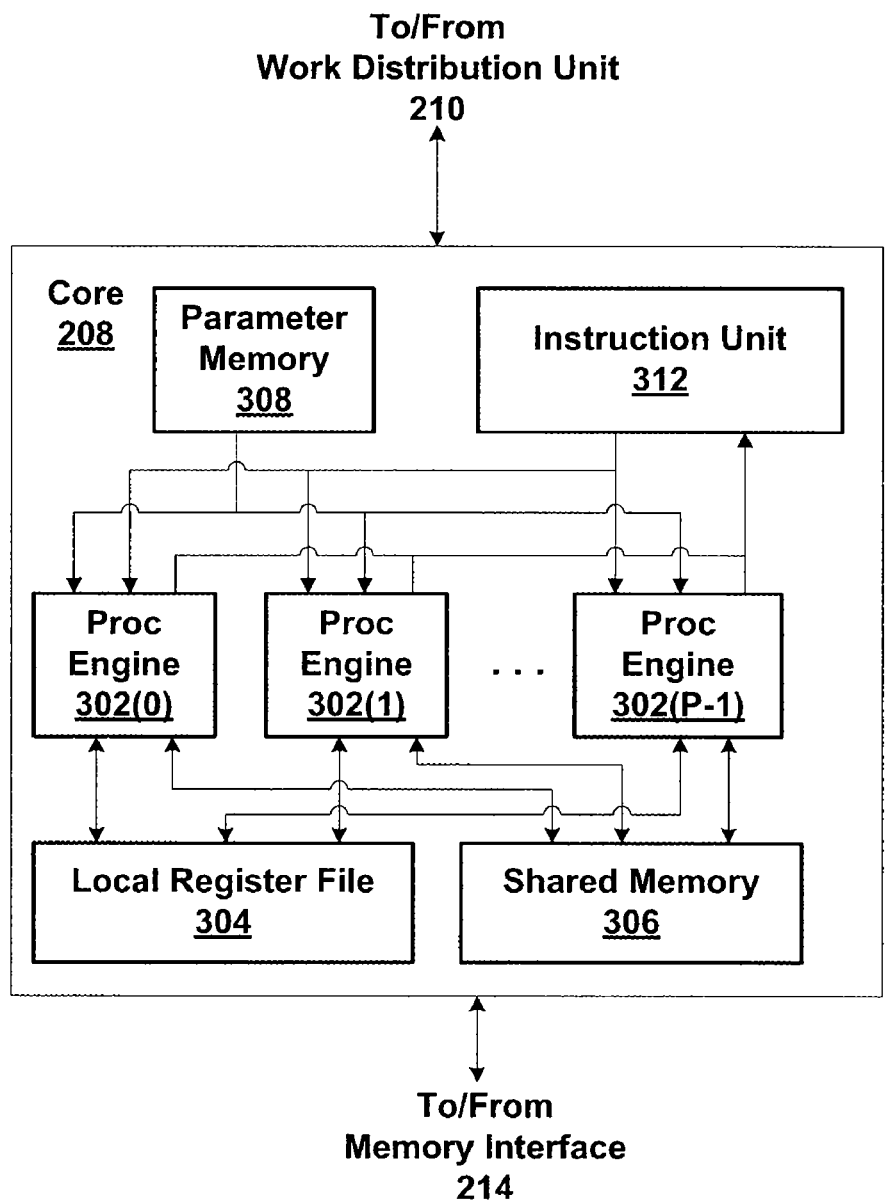
FIG. 3 is a block diagram of a parallel processing unit for the parallel processing subsystem of FIG. 2 in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In some embodiments, single-instruction, multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "warp" or "thread group." Additionally, a plurality of related thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is typically an integer multiple of the number of parallel processing engines 302 in a core 208, and m is the number of thread groups simultaneously active on the core 208. The size of a CTA is generally determined by the programmer and the amount of hardware resources, such as memory or registers, available to the CTA.

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations. Parallel processing engines 302 may be configured to perform vertex stitching operations, as described in conjunction with FIGS. 6, 7A, and 7B. Alternatively, one or more dedicated vertex stitching units may be included within core 208 to perform the vertex stitching operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate synchronous parallel execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208 and may be used to transfer data between different threads. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants and per-vertex parameters) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) may be issued to all P processing engines 302. Thus, at the level of a single clock cycle, core 208 implements a microarchitecture substantially representing a P-way SIMT or SIMD design. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in thread groups. As used herein, a "thread group" refers to a group of up to P threads of execution of the same program on different input data, with one thread of the group being assigned to each processing engine 302. A thread group may include fewer than P threads, in which case some of processing engines 302 will be idle during cycles when that thread group is being processed. A thread group may also include more than P threads, in which case processing will take place over consecutive clock cycles. Since each processing engine 302 can support up to G threads concurrently, it follows that up to G thread groups can be executing in core 208 at any given time.

On each clock cycle, one instruction is issued to all P threads making up a selected one of the G thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 may be synchronously executing the same instruction for different threads in the same thread group. Those skilled in the art will recognize that such synchronous parallel execution of each thread in a thread group is characteristic of a SIMD architecture. When the threads in a thread group are executing synchronously, processing engines 302 are configured to execute instructions in a SIMD manner. However, in some instances, some threads in a thread group may be temporarily idle, e.g., due to conditional or predicated instructions, divergence at branches in the program, or the like, as described further herein. Processing engines 302 may be configured to function as SIMD or SIMT engines.

Operation of core 208 is advantageously controlled via a core interface. In some embodiments, core interface receives data to be processed (e.g., surface (patch) data, primitive data, vertex data, and/or pixel data) as well as state parameters and commands defining how the data is to be processed (e.g., what program is to be executed) from work distribution unit 210. Core interface can load data to be processed into shared memory 306 and parameters into parameter memory 308. Core interface also initializes each new thread or thread group in instruction unit 312, then signals instruction unit 312 to begin executing the threads. When execution of a thread or thread group is completed, core 208 advantageously notifies core interface. Core interface 303 can then initiate other processes, e.g., to retrieve output data from shared memory 306 and/or to prepare core 208 for execution of additional threads or thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Graphics Pipeline Architecture

Figure 4:
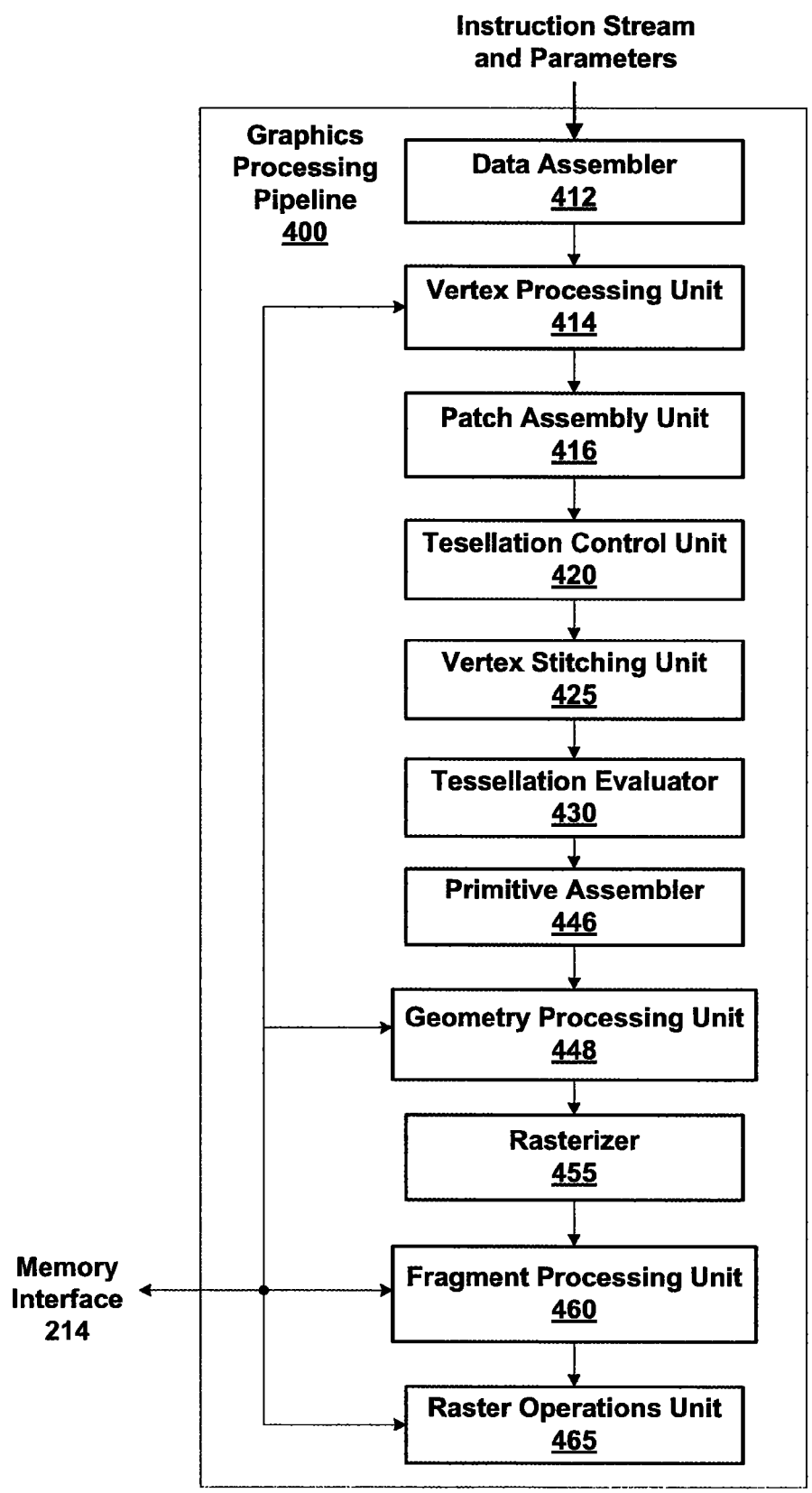
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example, core 208 may be configured to perform the functions of one or more of a vertex processing unit 414, a tessellation control unit 420, a tessellation evaluator 430, a geometry processing unit 448, and a fragment processing unit 460. The functions of data assembler 412, patch assembly unit 416, vertex stitching unit 425, primitive assembler 446, rasterizer 455, and raster operations unit 465 may also be performed by core 208. Alternately, graphics processing pipeline 400 may be implemented using dedicated processing units for one or more of vertex processing unit 414, tessellation control unit 420, tessellation evaluator 430, geometry processing unit 448, fragment processing unit 460, vertex stitching unit 425, patch assembly unit 416, primitive assembler 446, rasterizer 455, and raster operations unit 465.

Data assembler 412 processing unit collects vertex data for high-order surfaces, primitives, and the like, and outputs the vertex data to vertex processing unit 414. Vertex processing unit 414 is a programmable execution unit that is configured to execute vertex shader programs, computing vertex data using the patch data, and transforming vertex data as specified by the vertex shader programs. For example, vertex processing unit 414 may be programmed to transform the vertex data from an object-based coordinate representation (object space) to an alternatively based coordinate system such as world space or normalized device coordinates (NDC) space. Vertex processing unit 414 may read data that is stored in parameter memory 208, PP memory 204, or system memory 104 for use in processing the vertex data.

Patch assembly unit 416 receives the vertex data and produces patch data Tessellation control unit 420 subdivides the patch data and computes tessellation LOD values for the patches. Vertex stitching unit 425 receives the patch data representing high-order surfaces, primitives, and the like, performs vertex stitching and outputs ordered lists of vertices (or vertex indices that are used to access a vertex cache or parameter memory 308) that define graphics primitive topologies to tesselation evaluator 430. Tessellation evaluator 430 evaluates the vertex parameters for each vertex to produce per-vertex attributes, such as position, color, texture coordinates, and the like.

Primitive assembler 446 receives vertex attributes from tesselation evaluator 430 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. In some embodiments of the present invention, geometry processing unit 448 may also add or delete elements in the geometry stream. Geometry processing unit 448 outputs the parameters and vertices specifying new graphics primitives to rasterizer 455 or to memory interface 214. Geometry processing unit 448 may read data that is stored in PP memory 204 or system memory 104 for use in processing the geometry data.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in PP memory 204 or system memory 104 for use in processing the fragment data. Fragments may be shaded at pixel, sample, or other granularity, depending on the programmed sampling rate.

Memory interface 214 produces read requests for data stored in graphics memory and performs texture filtering operations, e.g., bilinear, trilinear, anisotropic, and the like. In some embodiments of the present invention, memory interface 214 may be configured to decompress data. In particular, memory interface 214 may be configured to decompress fixed length block encoded data, such as compressed data represented in a DXT format. Raster operations unit 465 is a processing unit that performs raster operations, such as stencil, z test, and the like, and outputs pixel data as processed graphics data for storage in graphics memory. The processed graphics data may be stored in graphics memory, e.g., PP memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Boundary Transition Region Stitching

Figure 5A:
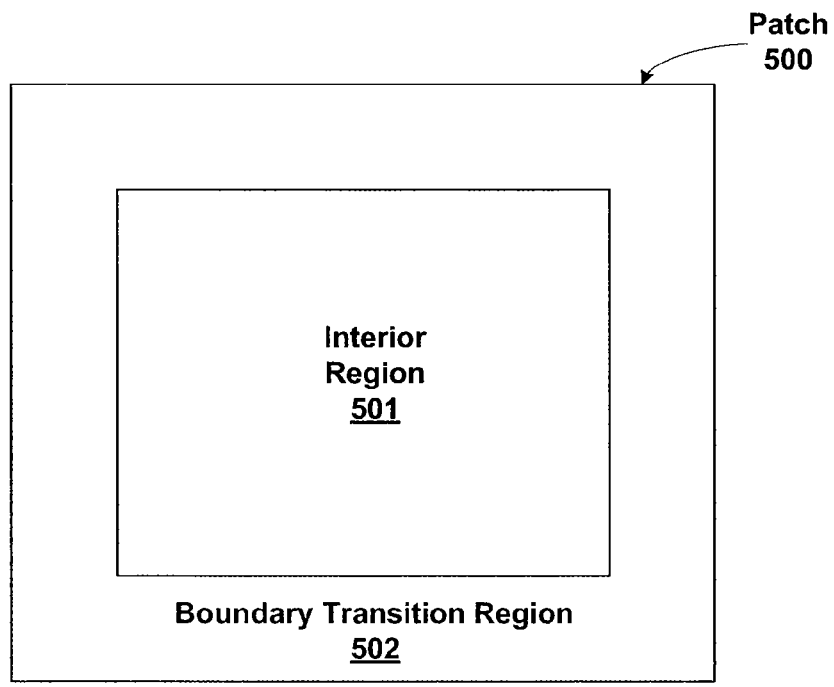
FIG. 5A illustrates an interior region and a transition region of a patch in accordance with one or more aspects of the present invention.

Surfaces constructed of three-dimensional patches, such as Bezier patches, NURBS (non-uniform rational b-splines), and subdivision surfaces are tessellated to form graphics primitives. As needed, patches are partitioned into smaller patches (interior or exterior) in order to perform tessellation in parallel within cores 208. Each one of the smaller patches is divided into an interior region and transition regions. FIG. 5A illustrates an interior region 501 and a transition region 502 of a patch 500, in accordance with one or more aspects of the present invention. Interior region 501 has a tessellation LOD along each edge and the interior region LODs (two, one in each direction) are also LODs of transition region 502, in addition to the four LODs along each edge of patch 500. Transition region 502 can be broken into separate regions that are each associated with an edge of patch 500 and include a one primitive wide band around the perimeter of interior region 501. Vertices on the edges of transition region 502 are stitched to define a topology of transition region 502. The topology includes high quality primitives that form a smoothly-varying triangle mesh for various combinations of tessellation LODs.

The high quality graphics primitives have similar aspect ratios, so that triangles are equilateral in shape rather than long and narrow. Specifically, the aspect ratio of the length of the longest triangle edge to the shortest triangle edge is close to one. Additionally, the high quality graphics primitives are stitched so that the valence at each vertex (number of triangle edges that terminate at the vertex) is consistent and low. The triangle mesh topology varies smoothly as the tessellation LODs change over time and across adjacent transition regions 502. Similar tessellation LODs produce similar and consistent topologies when high quality graphics primitives are used.

Figure 5B:
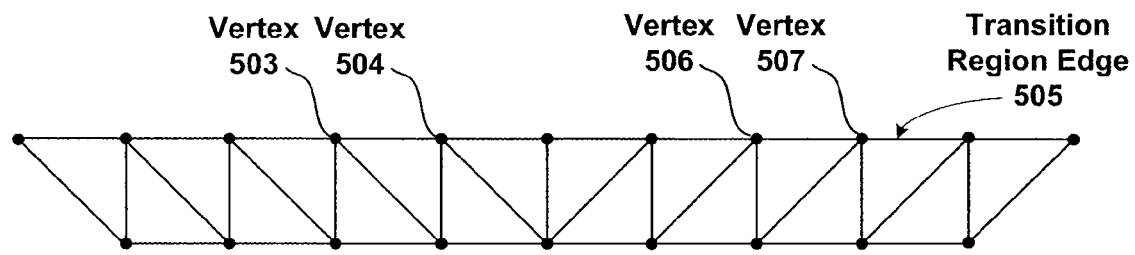
FIG. 5B illustrates a transition region edge in accordance with one or more aspects of the present invention.

FIG. 5B illustrates a portion of transition region 502, a transition region edge 505, in accordance with one or more aspects of the present invention. The tessellation LOD along each edge of transition region edge 505 determines the number of segments along each edge. Similarly, interior region 501 is tessellated according to the tessellation LOD in each direction of interior region 501. The tessellation LOD values on either side of transition region edge 505 may differ. Stitching should produce a set of non-intersecting graphics primitives (triangles) that completely cover transition region edge 505 and that include vertices that are common with a transition region of any adjacent patch, as shown in FIG. 5B.

A tessellation LOD of the interior edge of transition region edge 505 is ten and the number of segments is LOD-2, or eight. The tessellation LOD of the patch edge of transition region edge 505 is ten and the number of segments equals the LOD and the number of vertices corresponds to the LOD. When tessellated, triangles of similar sizes are produced, rather than triangles with unnecessarily obtuse angles. When the tessellation LODs on each edge of a transition region are not equal, triangles are removed to reduce the number of segments. For example, when the tessellation LOD along the patch edge of transition region edge 505 is reduced from ten to eight, one of vertexes 503 and 504 is merged with another vertex and one or vertexes 506 and 507 is merged with another vertex to remove two triangles. Effectively, vertex 504 merges with vertex 503 and vertex 506 merges with vertex 507 to produce transition region edge 508.

Figure 5C:
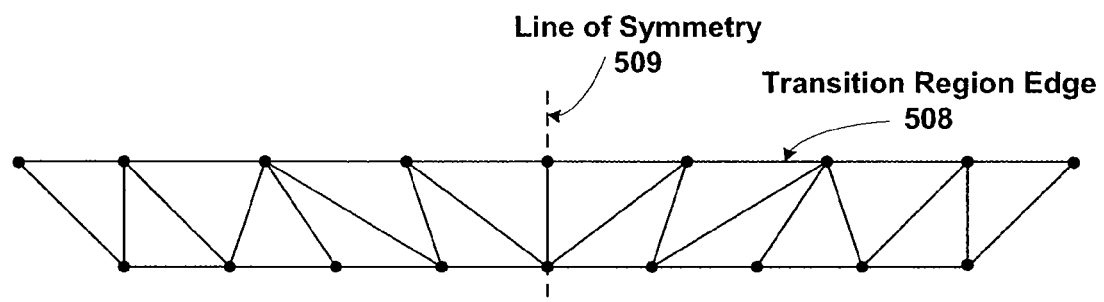
FIG. 5C illustrates a transition region edge with different levels of detail in accordance with one or more aspects of the present invention.

FIG. 5C illustrates a transition region edge 508 with different levels of detail, in accordance with one or more aspects of the present invention. A tessellation LOD of the interior edge of transition region edge 508 is ten and the number of segments is LOD-2, or eight. A tessellation LOD of the interior edge of transition region edge 505 is ten and the number of segments is LOD-2, or eight. The tessellation LOD of the patch edge of transition region edge 508 is eight and the number of segments equals the LOD. Transition region edge 508 is the result of merging vertex 503 and 504 and vertex 506 and 507 of transition region edge 505.

Removing a triangle from either side of a line of symmetry 509 creates a set of non-intersecting triangles without unnecessarily obtuse angles and irregular triangle fans. When the LOD changes by one instead of two, the vertex pairs on either side of line of symmetry 509 are merged to remove two triangles and a vertex is split on the edge at line of symmetry 509 to form a new triangle centered on line of symmetry 509. The insertion of a triangle is described in more detail in conjunction with FIG. 5F.

FIG. 5D illustrates a transition region edge 510 with a graphics primitive stitching pattern, in accordance with one or more aspects of the present invention. Transition region edge 510 should be triangulated using triangles that are as close to equilateral as possible when the LOD for the inside and outside edges are equal. The numbers along the outside edge of transition region edge 510 indicate the order in which triangles are removed or inserted by merging or splitting vertices as the LOD varies. Higher numbered triangles are removed first and lower numbered triangles are removed later when the LOD decreases. The vertex stitching for a given pair of LODs includes only the triangles in the stitching pattern that are numbered less than half of the LOD.

Note that the stitching pattern is symmetric and that the numbers are not sequential. A stitching pattern that distributes the insertion or removal of triangles along an edge is desirable to ensure smoothly varying changes to the topology as the LOD values change. Symmetry allows for an edge to be traversed in either direction to determine the topology. Therefore, adjacent transition region edges and edges shared between a patch interior and transition regions produce topologies with shared vertices.

Triangles 517, 527, 537, and 547 correspond to number 7 in the stitching pattern and are the first triangles that are removed as the LOD decreases. Triangles 516, 526, 536, and 546 correspond to number 6 in the stitching pattern and are the second triangles that are removed. Triangles 515, 525, 535, and 545 correspond to number 5 in the stitching pattern and are the third triangles that are removed. Triangles 514, 525, 534, and 544 correspond to number 4 in the stitching pattern and are the fourth triangles that are removed. Triangles 513, 523, 533, and 543 correspond to number 3 in the stitching pattern and are the fifth triangles that are removed. Triangles 512, 522, 532, and 542 correspond to number 2 in the stitching pattern and are the sixth triangles that are removed. Triangles 511, 521, 531, and 541 correspond to number 1 in the stitching pattern and are the seventh triangles that are removed. Triangles 520 and 540 correspond to number 0 in the stitching pattern and are replaced with a single triangle when the LODs are decreased from two to one.

Other stitching patterns may use different number sequences. The particular number sequence shown in FIG. 5D merges vertices in such a way as to produce similarly sized triangles. Additionally, when the LOD of the inside edge equals $2^i$ and the LOD of the outside edge equals $2^j$, where i and j are integers, the topology that is produced includes triangles of equal size that are as close as possible to equilateral triangles. When the LOD of the inside edge equals the LOD of the outside edge, the topology that is produced also includes triangles of equal size that are as close as possible to equilateral triangles.

TABLE 1 is a set of program instructions for generating a stitching pattern for one half of the transition region associated with one edge of a patch with a maximum LOD of 256. The program instructions are presented in C pseudo-code for ease of presentation. Lod_b is the LOD of the outside edge and lod_i is the LOD of the inside edge.

TABLE 1

```
transition_pattern (int lod_b, int lod_i) {
    int i;
    int B = lod_b/2;
    int I = lod_i/2;
    // generate numbering scheme:
    int order [128];
    for (i=0; i<128; i++) {
        int tmp = i;
        order[i] = 128/2;
        for (int j =0; j<7; j++) {// 7 = log2(128)
            if (!(tmp & 1)) {
                tmp >>= 1;
                order[i] >>= 1;
            }
        }
        order[i] += (tmp/2);
```

TABLE 1-continued

```
    }
}
```

FIG. 5E illustrates a transition region edge 555 with tessellation LODs of ten on the outside edge and six on the interior edge, in accordance with one or more aspects of the present invention. Triangles corresponding to numbers 5, 6, and 7 of the stitching pattern are removed on the outside edge of transition region edge 555. Triangles 550, 564, 562, 561, and 563 correspond to numbers 0, 4, 2, 1, and 3, of the stitching pattern, respectively. Similarly, triangles 580, 584, 582, 581, and 583 correspond to numbers 0, 4, 2, 1, and 3 of the stitching pattern, respectively. Triangles corresponding to numbers 3, 4, 5, 6, and 7 of the stitching pattern are removed on the inside edge of transition region edge 555. Triangles 551 and 552 correspond to numbers 1 and 2, of the stitching pattern, respectively. Similarly, triangles 571 and 572 correspond to numbers 1 and 2 of the stitching pattern, respectively.

FIG. 5F illustrates a transition region edge 560 with levels of detail of ten and seven, in accordance with one or more aspects of the present invention. As the LOD of the inside edge is increased from six to seven, a triangle 570 (and corresponding vertex 575) is inserted in the center of transition region edge 560. Triangles corresponding to numbers 5, 6, and 7 of the stitching pattern are removed on the outside edge of transition region edge 560. Triangles 550, 564, 565, 566, and 567 correspond to numbers 0, 4, 2, 1, and 3, of the stitching pattern, respectively. Similarly, triangles 580, 584, 585, 586, and 587 correspond to numbers 0, 4, 2, 1, and 3 of the stitching pattern, respectively. Triangles corresponding to numbers 3, 4, 5, 6, and 7 of the stitching pattern are removed on the inside edge of transition region edge 560, leaving triangles 553, 554, 573, and 574 and inserted triangle 570.

Figure 6:
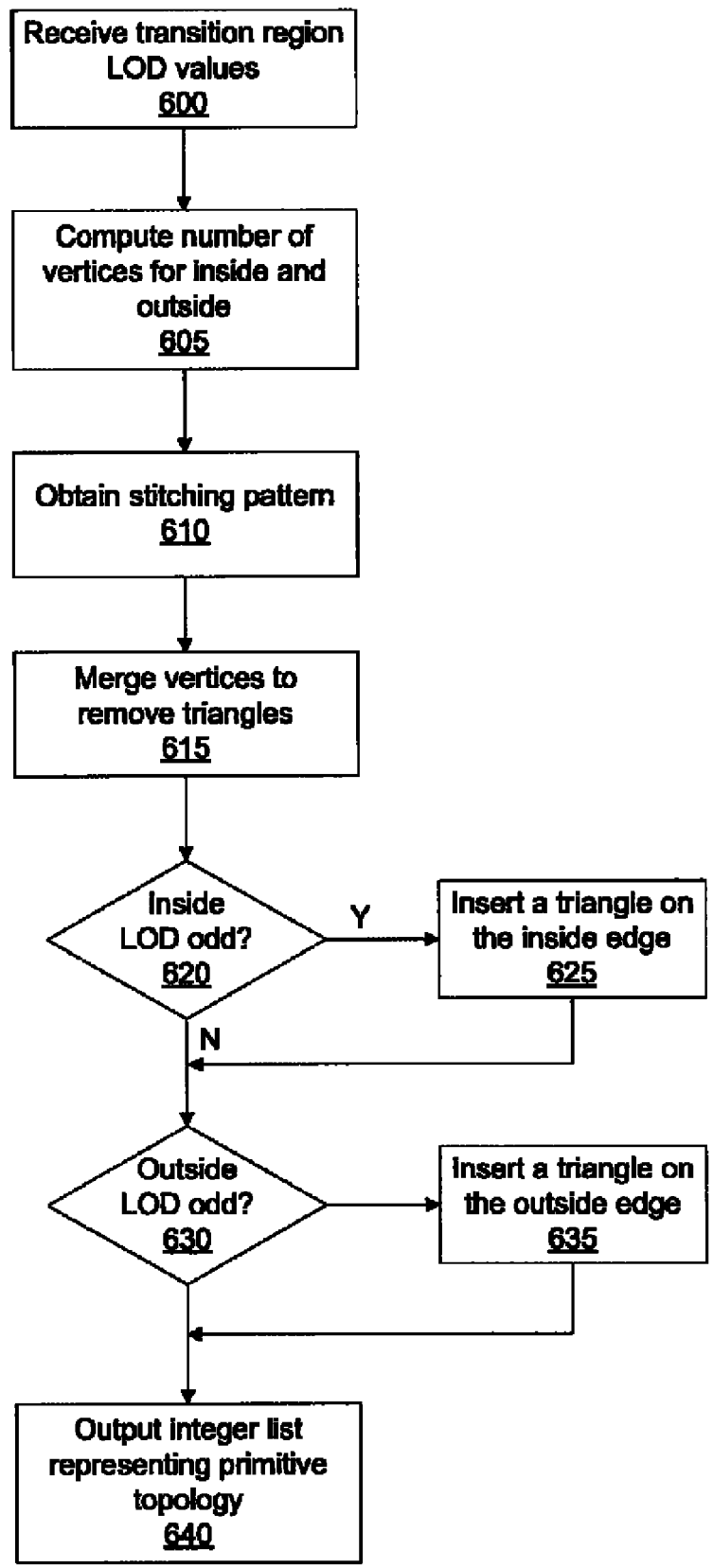
FIG. 6 is a flow diagram of method steps for stitching a boundary transition region for tessellation in accordance with one or more aspects of the present invention.

FIG. 6 is a flow diagram of method steps for stitching a boundary transition region for tessellation, in accordance with one or more aspects of the present invention. In step 600 LOD values for a transition region are received. In step 605 a first number of vertices for the inside edge and a second number of vertices for the outside edge of the transition region are computed. The second number of vertices for the outside edge is LOD/2 and the first number of vertices for the inside edge is LOD/2-2.

In step 610 the stitching pattern is obtained. The stitching pattern may be fixed or programmable. In step 615 vertices on the inside edge are merged to remove triangles based on the stitching pattern and the inside edge LOD and vertices on the outside edge are merged to remove triangles based on the stitching pattern and the outside edge LOD to produce a set of vertices. If, in step 620 the inside edge LOD is an odd number, then in step 625 a vertex is split to insert a triangle on the inside edge of the transition region at the line of symmetry. An equal number of vertices and triangles lie on along the inside edge on either side of the inserted triangle. If, in step 620, the inside edge LOD is not an odd number, i.e., the inside edge LOD is an even number, then an additional triangle is not inserted by splitting a vertex in the set of vertices.

If, in step 630 the outside edge LOD is an odd number, then in step 635 a triangle is inserted on the outside edge of the transition region at the line of symmetry. An equal number of vertices and triangles lie on along the outside edge on either side of the inserted triangle. If, in step 630, the outside edge LOD is not an odd number, i.e., the outside edge LOD is an even number, then an additional triangle is not inserted by splitting a vertex in the set of vertices. In step 640 an integer list representing the graphics primitive topology of the transition regions is output. The integer list includes the set of vertices stitched according to the stitching pattern.

TABLE 2 is a set of program instructions for producing an integer list that represents the stitched set of vertices for a boundary transition region. The program instructions are presented in C pseudo-code for ease of presentation. The instructions shown in TABLE 2 may be included in the transition_pattern function shown in TABLE 1.

TABLE 2

```
//generate triangulation
for (i=0; i<128; i++) {
    // discard the end vertices on the inside edge
    if (( i>0) && (order[i] < I)) {
        advance inside vertex
    }
    if (order[i] < B) {
        advance outside vertex
    }
```

Figure 7A:
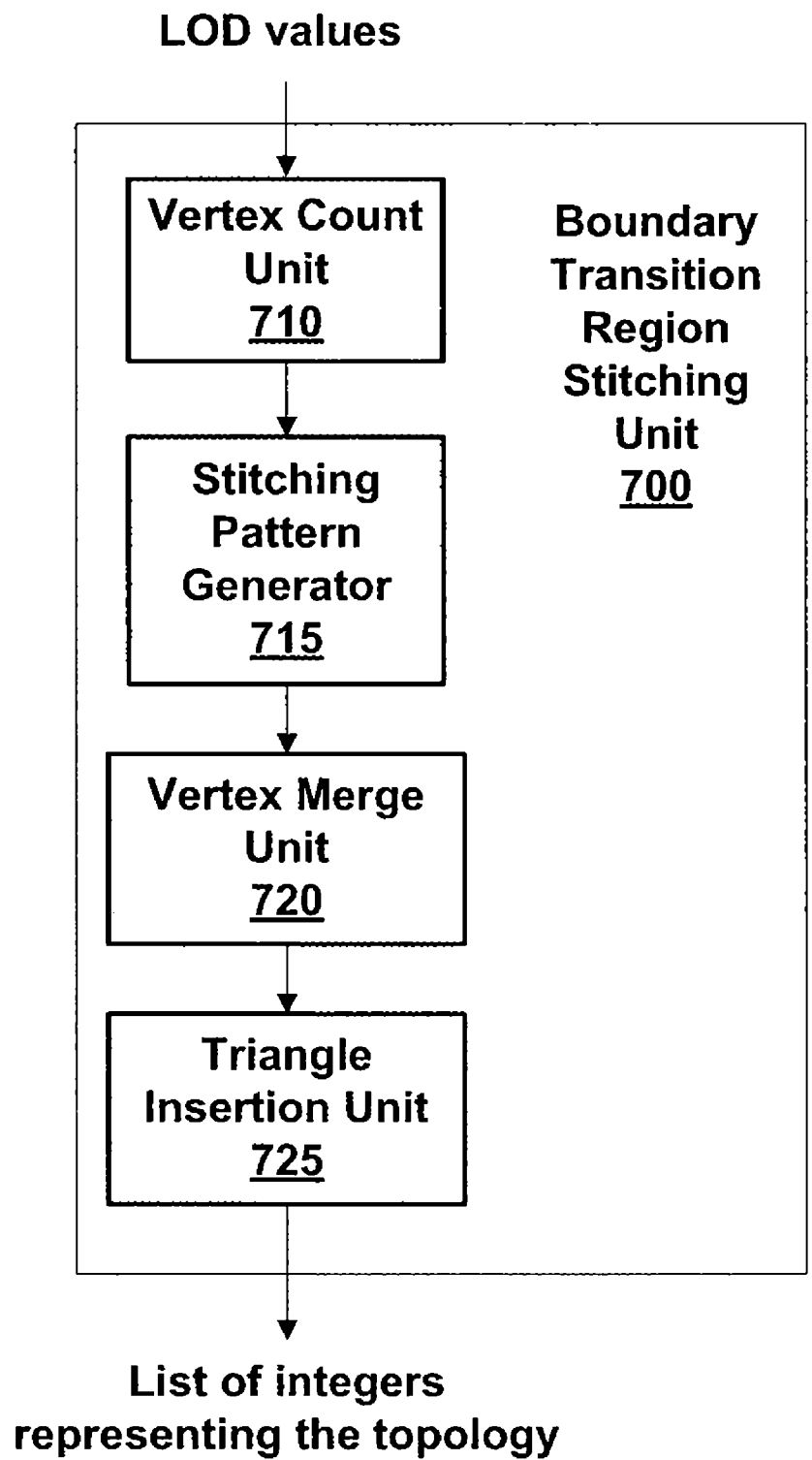
FIG. 7A is a block diagram of a boundary transition region stitching unit in accordance with one or more aspects of the present invention.

FIG. 7A is a block diagram of a boundary transition region stitching unit 700, in accordance with one or more aspects of the present invention. Boundary transition region stitching unit 700 receives LOD values for the inside and outside edges of a boundary transition region. Boundary transition region stitching unit 700 may be used to implement a portion of vertex stitching unit 425 of FIG. 4. A vertex count unit 710 computes the first number of vertices for the inside edge and a second number of vertices for the outside edge. A stitching pattern generator 715 produces a stitching pattern based on the first number and the second number of vertices. Circuitry configured to perform the operations of the code shown in TABLE 1 may be used to produce the stitching pattern.

A vertex merge unit 720 receives the stitching pattern, the first number, and the second number of vertices and produces the set of vertices as an integer list representing the primitive topology. Circuitry configured to perform the operations of the code shown in TABLE 2 may be used to produce the integer list. A triangle insertion unit 725 receives the LOD values and inserts an additional triangle (by splitting a vertex) for each LOD that is odd. The output of triangle insertion unit 725 is a list of integers that represents the primitive topology. Each integer is an index of a vertex in the set of vertices. The vertex parameters may be stored in a cache, register file, or other memory resource.

Figure 7B:
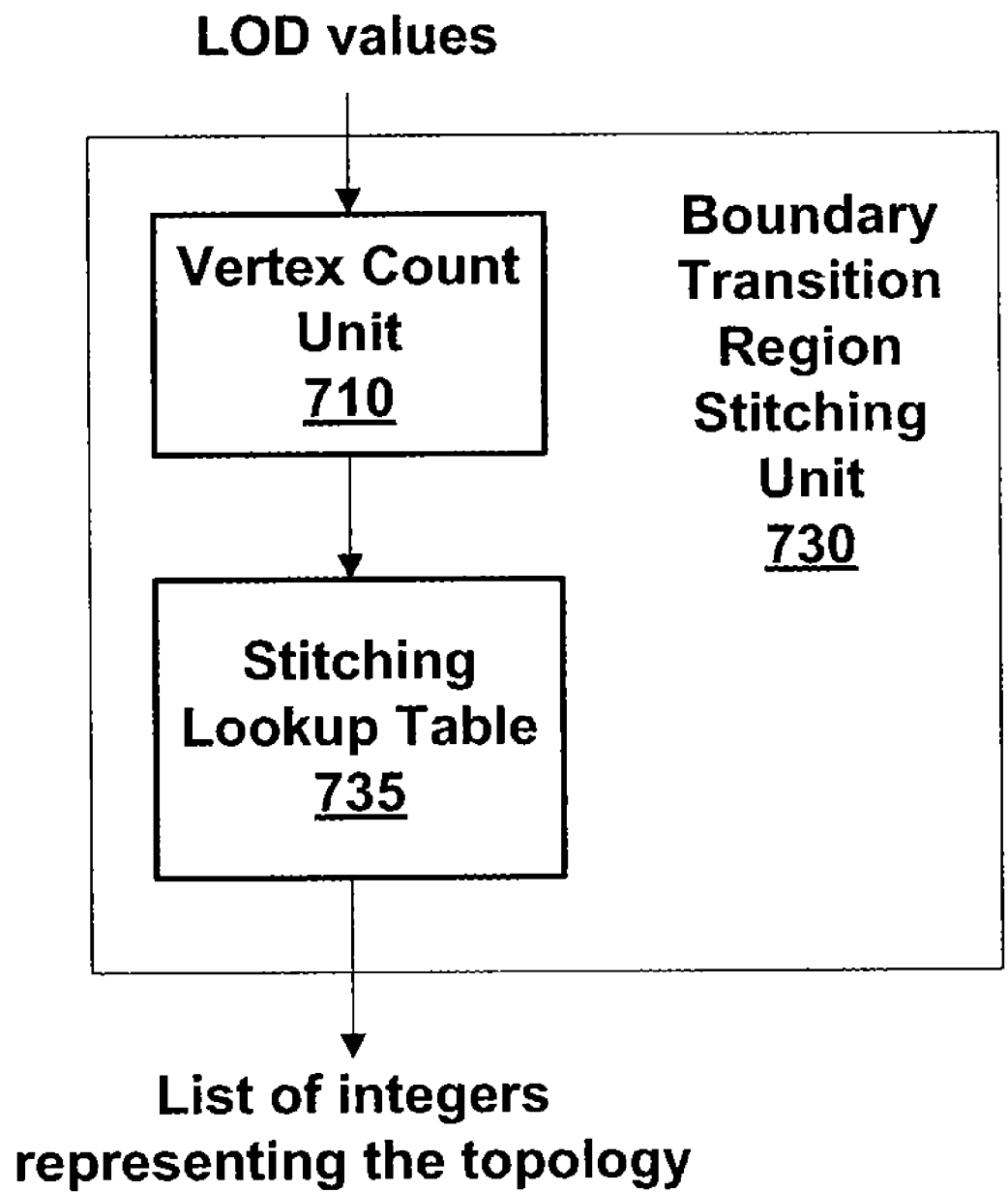
FIG. 7B is another block diagram of a boundary transition region stitching unit in accordance with one or more aspects of the present invention.

FIG. 7B is another block diagram of a boundary transition region stitching unit 730, in accordance with one or more aspects of the present invention. Boundary transition region stitching unit 730 may be used to implement a portion of vertex stitching unit 425 of FIG. 4. As previously described, vertex count unit 710 computes the first number of vertices for the inside edge and a second number of vertices for the outside edge. A stitching lookup table 735 receives the first number and second number of vertices and the LOD values (or just the least significant bit of each LOD value) and outputs the list of integers that represents the primitive topology. Stitching lookup table 735 may be configured to store the stitching pattern for half of various combinations of LOD values since the stitching pattern is symmetric.

The tessellation topology includes similarly sized graphics primitives that form a smoothly-varying triangle mesh for various combinations of tessellation LODs. The stitching algorithm produces high quality graphics primitives that have similar aspect ratios, so that triangles are equilateral in shape rather than long and narrow. Additionally, the high quality graphics primitives are stitched so that the number of triangles that meet or share a point is consistent, so that the triangles produced by the stitching algorithm are distributed evenly between the vertices. The triangle mesh topology varies smoothly as the tessellation LODs change over time and across adjacent boundary transition regions. A variety of stitching patterns may be defined to produce high quality triangles in a symmetric topology in order to produce triangle meshes for the boundary transition regions that share vertices with adjacent interior regions and boundary transition regions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for stitching a boundary transition region of a patch, the method comprising:
    computing a first number of vertices for an inside edge of the boundary transition region using a first tessellation level of detail (LOD) of the inside edge, wherein the first number of vertices is computed as two less than an integer portion of half of the first tessellation LOD;
    computing a second number of vertices for an outside edge of the boundary transition region using a second tessellation LOD of the outside edge, wherein the second number of vertices is computed as an integer portion of half of the second tessellation LOD;
    merging two vertices of one of the first number of vertices and the second number of vertices based on the first tessellation LOD and the second tessellation LOD to remove at least one triangle from the boundary transition region and produce a set of vertices for the boundary transition region; and
    stitching, using at least one processor, the set of vertices to produce an ordered list representing a graphics primitive topology for the boundary transition region of the patch.

2. The method of claim 1, further comprising splitting a vertex along the inside edge to insert a triangle so that the graphics primitive topology includes an equal number of vertices on either side of the triangle when the first tessellation LOD is an odd number.

3. The method of claim 1, further comprising splitting a vertex along the outside edge to insert a triangle so that the graphics primitive topology includes an equal number of vertices on either side of the triangle when the second tessellation LOD is an odd number.

4. The method of claim 1, further comprising the step of reading a lookup table that stores the stitching pattern as a sequence in which vertices should be merged to remove triangles from the inside edge and the outside edge.

5. The method of claim 1, wherein the first tessellation LOD is greater than the second tessellation LOD.

6. The method of claim 1, wherein the second tessellation LOD is greater than the first tessellation LOD.

7. The method of claim 1, wherein stitching pattern is symmetric on either side of an axis that is vertical to the inside edge.

8. The method of claim 1, wherein the graphics primitive topology includes graphics primitives of equal size when the first tessellation LOD equals $2^i$, where i is an integer and the second tessellation LOD equals $2^j$, where j is an integer.

9. A non-transitory computer readable medium storing instructions for causing a processor to stitch a boundary transition region of a patch by performing the steps of:
    computing a first number of vertices for an inside edge of the boundary transition region using a first tessellation level of detail (LOD) of the inside edge, wherein the first number of vertices is computed as two less than an integer portion of half of the first tessellation LOD;
    computing a second number of vertices for an outside edge of the boundary transition region using a second tessellation LOD of the outside edge, wherein the second number of vertices is computed as an integer portion of half of the second tessellation LOD;
    merging two vertices of one of the first number of vertices and the second number of vertices based on the first tessellation LOD and the second tessellation LOD to remove at least one triangle from the boundary transition region and produce a set of vertices for the boundary transition region, and
    stitching the set of vertices to produce an ordered list representing a graphics primitive topology for the boundary transition region of the patch.

10. A system for stitching a boundary transition region of a patch, the system comprising:
    a boundary transition region stitching unit having circuitry configured to:
    compute a first number of vertices for an inside edge of the boundary transition region using a first tessellation level of detail (LOD) of the inside edge, wherein the first number of vertices is computed as two less than an integer portion of half of the first tessellation LOD;
    compute a second number of vertices for an outside edge of the boundary transition region using a second tessellation LOD of the outside edge, wherein the second number of vertices is computed as an integer portion of half of the second tessellation LOD;
    merge two vertices of one of the first number of vertices and the second number of vertices based on the first tessellation LOD and the second tessellation LOD to remove at least one triangle from the boundary transition region and produce a set of vertices for the boundary transition region; and
    stitch the set of vertices to produce an ordered list representing a graphics primitive topology for the boundary transition region of the patch.

11. The system of claim 10, wherein the boundary transition region stitching unit is further configured to split a vertex along the inside edge to insert a triangle so that the graphics primitive topology includes an equal number of vertices on either side of the triangle when the first tessellation LOD is an odd number.

12. The system of claim 10, wherein the boundary transition region stitching unit is further configured to split a vertex along the outside edge to insert a triangle so that the graphics primitive topology includes an equal number of vertices on either side of the triangle when the second tessellation LOD is an odd number.

13. The system of claim 10, wherein the boundary transition region stitching unit is further configured to reading a lookup table that stores the stitching pattern as a sequence in which vertices should be merged to remove triangles from the inside edge and the outside edge.

14. The system of claim 10, wherein the first tessellation LOD is greater than the second tessellation LOD.

15. The system of claim 10, wherein the second tessellation LOD is greater than the first tessellation LOD.

16. The system of claim 10, wherein stitching pattern is symmetric on either side of an axis that is vertical to the inside edge.

17. The system of claim 10, wherein the graphics primitive topology includes graphics primitives of equal size when the first tessellation LOD equals $2^i$, where i is an integer and the second tessellation LOD equals $2^j$, where j is an integer.

18. The system of claim 10, wherein the graphics primitive topology includes graphics primitives of equal size when the first tessellation LOD equals the second tessellation LOD.

* * * * *